(12) United States Patent
Mena et al.

(10) Patent No.: US 9,828,116 B1
(45) Date of Patent: Nov. 28, 2017

(54) SPACECRAFT

(71) Applicant: AIRBUS DEFENCE AND SPACE SAS, Les Mureaux (FR)

(72) Inventors: Fabrice Mena, Teulat (FR); Patrick Coutal, Renneville (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 15/535,900

(22) PCT Filed: Dec. 15, 2015

(86) PCT No.: PCT/FR2015/053502
§ 371 (c)(1),
(2) Date: Jun. 14, 2017

(87) PCT Pub. No.: WO2016/097575
PCT Pub. Date: Jun. 23, 2016

(30) Foreign Application Priority Data

Dec. 17, 2014 (FR) ..................... 14 62565

(51) Int. Cl.
*B64G 1/50* (2006.01)
*B64G 1/44* (2006.01)
*B64G 1/22* (2006.01)

(52) U.S. Cl.
CPC ............. *B64G 1/503* (2013.01); *B64G 1/222* (2013.01); *B64G 1/446* (2013.01); *B64G 1/506* (2013.01)

(58) Field of Classification Search
CPC ........ B64G 1/503; B64G 1/506; B64G 1/222; B64G 1/446

USPC ....................................... 244/171.8
See application file for complete search history.

(56) References Cited

U.S. PATENT DOCUMENTS

| | | | | |
|---|---|---|---|---|
| 5,954,298 A | * | 9/1999 | Basuthakur | B64G 1/402 165/41 |
| 6,073,888 A | * | 6/2000 | Gelon | B64G 1/50 165/104.22 |
| 7,270,302 B1 | * | 9/2007 | Wong | B64G 1/50 244/171.8 |

(Continued)

FOREIGN PATENT DOCUMENTS

| JP | H03 109999 U | 11/1991 |
|---|---|---|
| KR | 101 240 434 B1 | 3/2013 |

OTHER PUBLICATIONS

European Patent Office, International Search Report and Written Opinion issued in corresponding PCT Application No. PCT/FR2015/053502, dated Mar. 24, 2016.

*Primary Examiner* — Brian M O'Hara
*Assistant Examiner* — Keith L Dixon
(74) *Attorney, Agent, or Firm* — Patzik, Frank & Samotny Ltd.

(57) ABSTRACT

The invention relates to a spacecraft comprising a body having two opposite faces; a first radiator carried by at least one face; the first radiator having an outer face; a first supporting arm extending substantially perpendicularly to the outer face of the first radiator; a drive motor suitable for rotating the first supporting arm about its longitudinal axis a first assembly carried by the first supporting arm, said first assembly comprising a plurality of slats stationary with respect to the first supporting arm; said slats being attached one above the other and separated from each other by a free space.

10 Claims, 4 Drawing Sheets

(56) References Cited

U.S. PATENT DOCUMENTS

| | | | |
|---|---|---|---|
| 9,352,856 B1 * | 5/2016 | Wu .................. | B64G 1/503 |
| 2008/0257525 A1 | 10/2008 | Ohnishi et al. | |
| 2014/0299714 A1 | 10/2014 | Wong | |

* cited by examiner

SPACECRAFT

FIELD OF THE INVENTION

The present invention relates to a spacecraft and in particular to a geostationary satellite.

BACKGROUND OF THE INVENTION

Because of the revolution of the Earth around the sun, the various faces of a geostationary satellite do not receive the same quantity of solar radiation over the seasons. As a result, there are cyclical variations in temperature on the face +Y and on the face −Y. Thus, during the winter and summer equinoxes (EQ), the faces −Y and +Y have lower temperatures than during the winter (WS) and summer (SS) solstices, as illustrated in FIG. 1. Moreover, the temperature of the faces of the satellite also fluctuates over time. This temperature is approximately equal to 20° C. at the beginning of the life of the satellite and is 70° C. at the end of the life of the satellite. These variations in temperature over the seasons and over time are reproduced on the ground in a vacuum atmosphere during satellite validation tests.

These validation tests are long and complex to carry out. To facilitate the validation tests on the ground, reducing the variations in temperature over the seasons and over time was envisaged.

For this purpose, the faces +Y and −Y of the satellite were heated by electric heaters during the equinox. Nevertheless, the heaters have limited effectiveness and require the electric power system of the satellite to be oversized. This oversizing notably increases the cost of the satellite.

Moreover, to regulate the temperatures of the faces of Earth-observation satellites, louvers were attached opposite radiators mounted on the outer faces of the satellites. These louvers obscure the outer face of the radiator more or less according to the cooling needs of the satellites. The louvers are mounted pivotably about an axis positioned along a longitudinal edge of the louvers. In the closed position, such louvers obscure all of the outer face of the radiator. The only function of these louvers is to prevent solar radiation from reaching the radiator. Moreover, these louvers require a complex mechanism allowing the rotation of the louvers. This mechanism must have good strength in a variable thermal environment.

Document JP H03 109999 discloses a satellite comprising a device that allows a portion of the incident solar radiation (Ie) to be absorbed mainly during the vernal and autumnal equinoxes and transferred via radiation to the adjacent radiator. This device comprises two heat-radiating plates, each mounted on a supporting arm of a solar panel. Over the course of a day, the two supporting arms and the two heat-radiating plates are rotated about the longitudinal axis of the supporting arms.

Each plate is solid. It has a high-absorptivity, high-emissivity face and an opposite, low-absorptivity face. This latter face is suitable for reflecting solar radiation. The plates are rotated about an axis perpendicular to the longitudinal axis of the supporting arm that supports it. The amplitude of rotation is approximately 180°. The rotation is carried out during certain seasons. Thus, at the vernal and autumnal equinox, the high-absorptivity faces of the two heat-radiating plates are pivoted in such a way as to form an angle of 23° with the radiators.

Thus, the high-absorptivity faces absorb solar radiation and emit heat to the radiators. During the summer solstice, the heat-radiating plate of the supporting arm located on the North side is rotated in order for its low-absorptivity face to be directed towards the solar radiation and be perpendicular to the North radiator. This face is thus exposed towards the sun in order to not heat the South radiator of the satellite when it is exposed to direct solar radiation.

Finally, during the winter solstice, the heat-radiating plate of the supporting arm located on the South side is rotated in order for its low-absorptivity face to be directed towards the solar radiation and be perpendicular to the South radiator.

This device, however, requires one or two additional electric motors. This or these motors make the satellite heavier and increase its manufacturing cost.

Moreover, the satellite of document JP H03 109999 is not secure. If a part or one of the motors for rotating the heat-radiating plates breaks down during a mission, it is difficult to repair them. If, in addition, this breakdown takes place during the solstices, the heat-radiating plates remain in a position that will increase the temperature differences during the other seasons and will endanger the operation of the on-board electronic equipment.

SUMMARY OF THE INVENTION

The purpose of the present invention is to propose a system that has a lower cost, is more reliable, and would allow the variations in temperature between the North and South faces of a satellite during the equinoxes and during the solstices to be limited.

For this purpose, the object of the invention is a spacecraft comprising:
- a body having a face +Y and a face −Y opposite the face +Y;
- a first radiator carried by at least one face out of the face +Y and the face −Y; said first radiator having an outer face;
- a first supporting arm extending substantially perpendicularly to the outer face of the first radiator, said first supporting arm having a longitudinal axis (A-A);
- a drive motor suitable for rotating the first supporting arm about said longitudinal axis (A-A) of the first supporting arm, the speed of rotation of the first supporting arm being substantially equal to the speed of revolution of the sun around the spacecraft;
- a first assembly carried by the first supporting arm, said first assembly having at least one absorption face suitable for absorbing a portion of the incident solar radiation during the vernal and autumnal equinoxes, said first assembly being suitable for transmitting said absorbed heat to the first radiator; said absorption face being inclined with respect to the outer face of the first radiator by an angle substantially between 20° and 26°; said first assembly 34 comprises at least two slats 36 attached one above the other and separated from each other by a free space e, said slats being stationary with respect to the first supporting arm 32.

Advantageously, in the present invention, the slats are stationary with respect to the supporting arm. This results in a system that is simpler, less costly and more reliable.

Advantageously, the assembly according to the invention has a surface containing holes that variably and selectively (1% to 100%) absorbs the incident solar radiation. Indeed, the solar radiation "passes through" the assembly during the solstices. This gives it the quality of being discrete during the desired season and allows its "stationary" nature.

Although the slats obscure a portion of the radiation during the solstices, their thickness is so small that the resulting loss of heat is highly negligible since it represents a few percent of the heat collected, typically approximately 5%.

Advantageously, in the assembly according to the invention, only the absorption face is exposed to the incident solar radiation, and this face is always vertically in line with the adjacent radiator.

Advantageously, the assembly according to the invention is less costly to manufacture. Moreover, it is passive and does not require an electric power supply.

Advantageously, the assembly according to the invention is small and has a very low mass of approximately several kilograms, typically approximately one kilogram.

According to specific embodiments, the spacecraft comprises one or more of the following features:
The first radiator is carried by the face −Y and wherein said slats of the first assembly are substantially parallel to the direction of the solar radiation during the summer solstice.

Advantageously, since said at least slat is inclined by an angle corresponding to the angle formed between the outer face of the radiator and the direction taken by the solar radiation during the solstice, said at least slat is not heated during the solstice.

the spacecraft comprises a second radiator carried by the other face out of the face −Y and the face +Y; said second radiator having an outer face; a second supporting arm extending substantially perpendicularly to the outer face of the second radiator, said second supporting arm having a longitudinal axis (B-B);

a drive motor suitable for rotating the second supporting arm about said longitudinal axis (B-B) of the second supporting arm, the speed of rotation of the second supporting arm being substantially equal to the speed of revolution of the sun around the spacecraft;

a second assembly carried by the second supporting arm, said second assembly having at least one absorption face inclined with respect to the outer face of the second radiator by an angle (a) substantially between 20° and 26°, and wherein said second assembly comprises a plurality of slats stationary with respect to the second supporting arm; since said slats are attached one above the other and separated from each other by a free space, said slats of the second assembly are substantially parallel to the direction of the solar radiation during the winter solstice The craft comprises at least one solar panel, and wherein said supporting arm supports said at least one solar panel.

Since the solar panels are generally rotated about an axis perpendicular to the outer face of the radiator at a speed equal to the speed of revolution of the sun around the spacecraft, the use of this supporting arm to carry the assembly of slats allows an additional rotation mechanism to not be added. This implementation is very advantageous from an economic point of view.

The slats comprise a polyimide film and rods suitable for rigidifying said polyimide film.

Said at least absorption face has a coating having high solar absorptivity, for example a black coating.

The outer face of said radiator has a non-specular coating.

Each slat has a thickness of less than one millimeter.

The slats of one assembly out of the first assembly and the second assembly are parallel to each other.

BRIEF DESCRIPTION OF THE DRAWINGS

The invention will be better understood after reading the following description, given only as an example and made in reference to the drawings, in which.

DETAILED DESCRIPTION OF THE INVENTION

The present invention is defined with respect to an orthogonal reference frame R (X, Y, Z) shown in FIGS. 2 to 5. The direction of the vectors X, Y and Z is defined as being the positive direction. The opposite direction is defined as being a negative direction.

In the various drawings, the same reference signs designate identical or similar elements.

Figure 2:
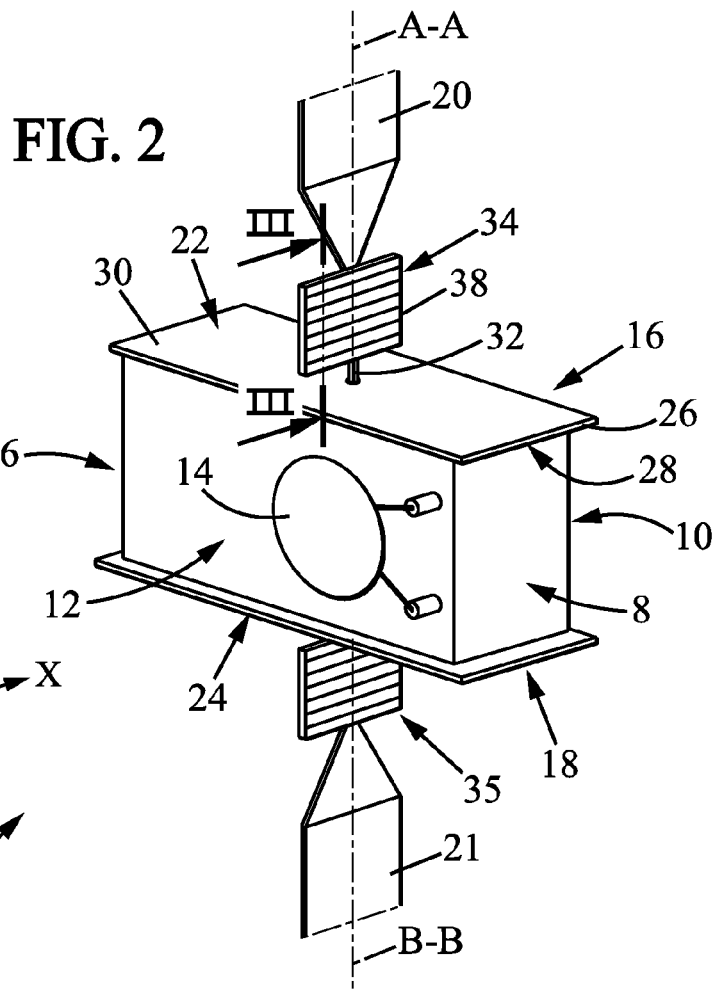
FIG. 2 is a perspective view of the spacecraft according to a first embodiment of the invention in geostationary orbit.

In reference to FIG. 2, a spacecraft 2 according to the first embodiment of the invention is in the form of a parallelepipedic body 4. This body 4 always has the same face oriented towards the Earth, this face being called the Earth face 6. The face opposite and parallel to the earth face 6 is called the anti-Earth face 8.

The face −X, also called East face 10, and the face +X, also called West face 12, are opposite faces parallel to each other and perpendicular to the direction of movement of the spacecraft 2. Communication antennas 14 are generally attached to the faces −X 10 and +X 12. The face −Y, also called North face 16, and the face +Y, also called South face 18, are two other faces of the body. They are opposite, parallel to each other and perpendicular to the North-South axis of the Earth.

The spacecraft 2 comprises a first radiator 22 and a second main radiator 24 in order to cool electronic equipment contained in the body. This electronic equipment not shown in the drawings is thermally connected to the first and to the second radiator, for example via heat pipes also not shown.

The first radiator 22, having a generally parallelepipedic shape, has four lateral faces 26, an inner main face 28 attached to the face −Y 16, an outer main face 30 opposite the inner main face and located on the side of the space outside of the spacecraft. The inner 28 and outer 30 main faces extend in the plane (X, Y). The second radiator 24 is identical to the first radiator 22. It will not be described in detail. It is attached to the face +Y 18.

Figure 1:
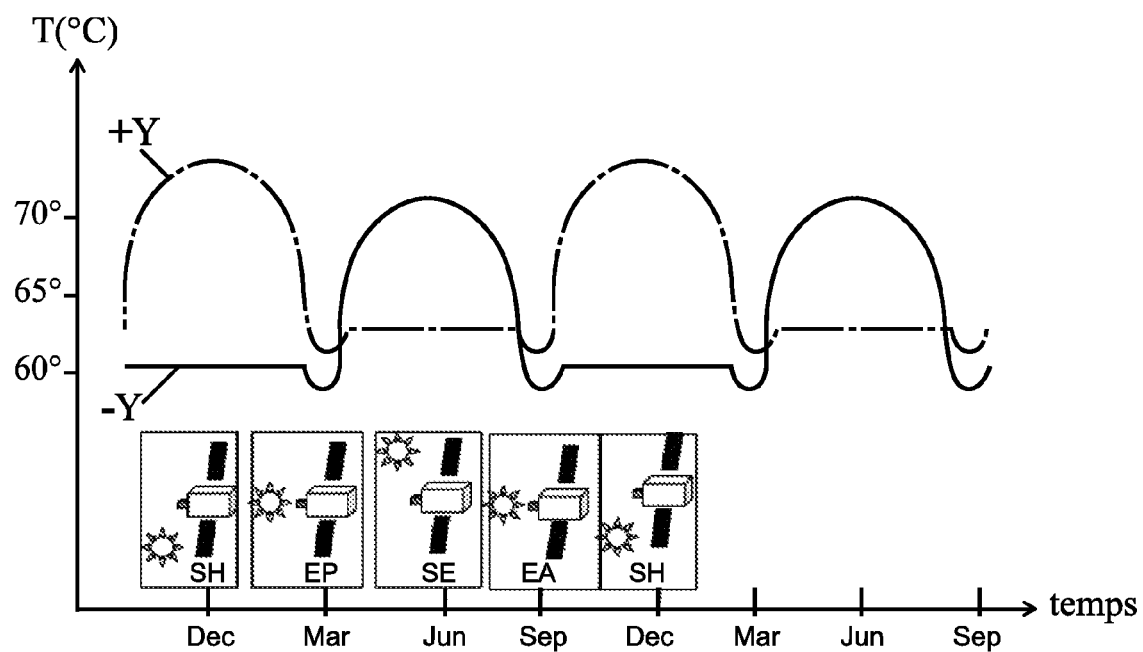
FIG. 1 are two curves representative of the variations in temperature of the faces +Y and −Y of a spacecraft according to the prior art over one year.
Figure 6:
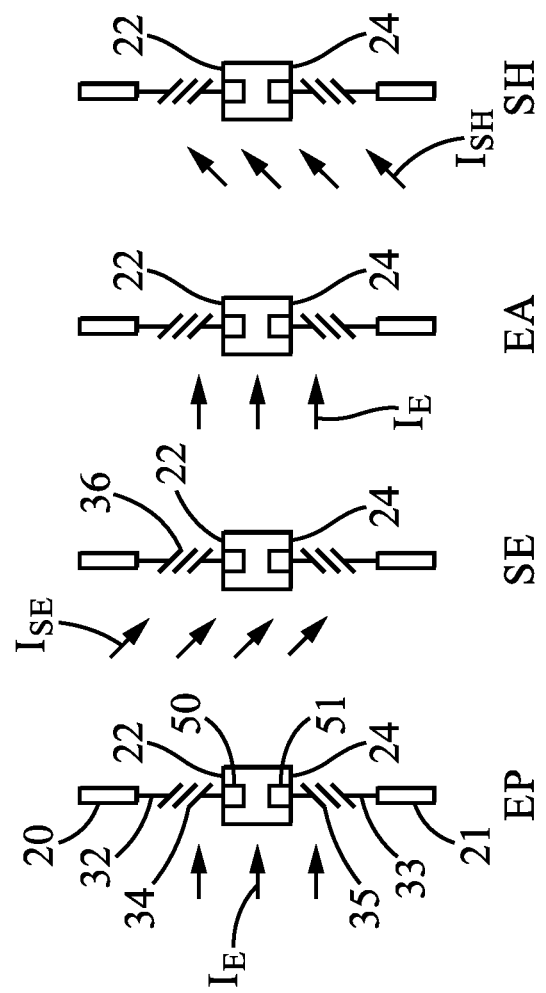
FIG. 6 is a simplified schematic view of an embodiment of the satellite according to the invention at the vernal equinox EP, at the summer solstice SE, at the autumnal equinox EA and at the winter solstice SH.

In reference to FIGS. 1 and 6, the spacecraft 2 comprises a first 32 and a second 33 supporting arm extending substantially in the Y direction, a first 20 and a second 21 solar panel attached to a distal end of the first 32 and the second 33 supporting arm, and one or two gear motors 50, 51 suitable for rotating the first 32 and respectively the second 33 supporting arm at a speed substantially equal to the speed of revolution of the sun around the spacecraft. Thus, the solar panels 20,21 are aimed at the sun all day long.

The first supporting arm 32 has a longitudinal axis (A-A). The gear motor 50 is suitable for rotating the first supporting arm 32 about the longitudinal axis (A-A). The second supporting arm 33 has a longitudinal axis (B-B). The gear motor 51 is suitable for rotating the second supporting arm 33 about the longitudinal axis (B-B).

Alternatively, a single gear motor is suitable for driving the first supporting arm 32 and the second supporting arm 33.

The spacecraft 2 further comprises a first assembly 34 of slats 36 and a second assemblies 35 of slats 36 attached to the first supporting arm 32 and to the second supporting arm 33, respectively, between the body 4 and the first solar panel 20 and the second solar panel 21. Each assembly 34,35 of slats is stationary with respect to the supporting arm 32,33 that carries it. Each assembly 34,35 of slats is rotated by the supporting arm 32,33 that carries it.

The slats 36 of the assemblies of slats transfer heat. They are suitable for absorbing solar radiation during the equinox and transferring, via radiation, the heat generated by this solar radiation to the first radiator 22 and to the second radiator 24, as explained below.

The heat-transfer slats 36 are plates having a very small thickness of approximately one millimeter or less. They are, for example, made from a sheet and rigidifying rods attached to a face of the sheet. The sheet is made, for example, from a polyimide film designated by the registered trademark Kapton or from graphite layers. The rods are, for example, made from carbon.

Figure 3:
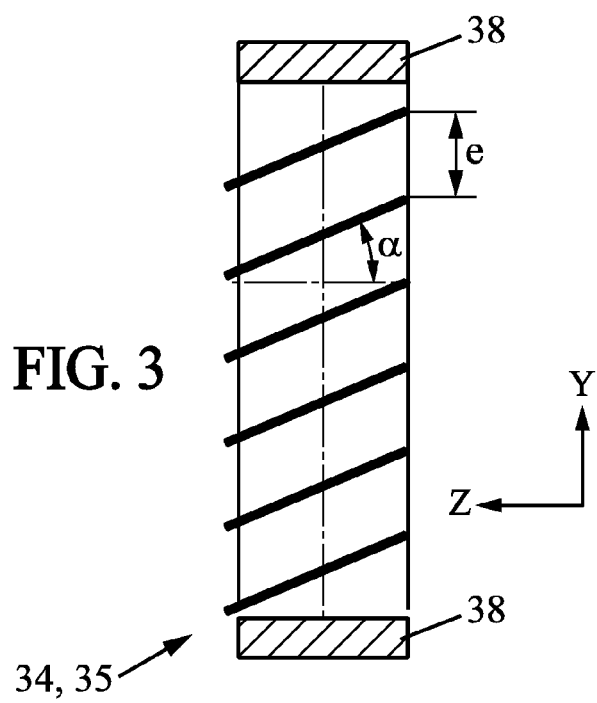
FIG. 3 is a cross-sectional view of an assembly of heat-transfer slats.

As visible in FIG. 3, the heat-transfer slats 36 are attached one above the other. They are superimposed in the Y direction. A free space e is arranged between two heat-transfer slats 36 superimposed on one another. The heat-transfer slats 36 of the assembly are advantageously attached in a frame 38.

The heat-transfer slats 36 have a flat main face 40, called absorption face 40, positioned facing the outer face 30 of the first radiator or of the second radiator 24 and an outer face 42 opposite the absorption face 40. The absorption face 40 of the first assembly 34 of slats mounted on the face −Y 16 is inclined with respect to the outer main face 30 of the first radiator by a dihedral angle α approximately equal to 23.5°. Likewise, the absorption face 40 of the second assembly 35 of slats mounted on the face +Y 18 is inclined with respect to the outer main face 30 of the second radiator by a dihedral angle α approximately equal to 23.5°. The opening of said dihedral angle α extends on the side of the direction of the incident solar radiation Is.

Figure 4:
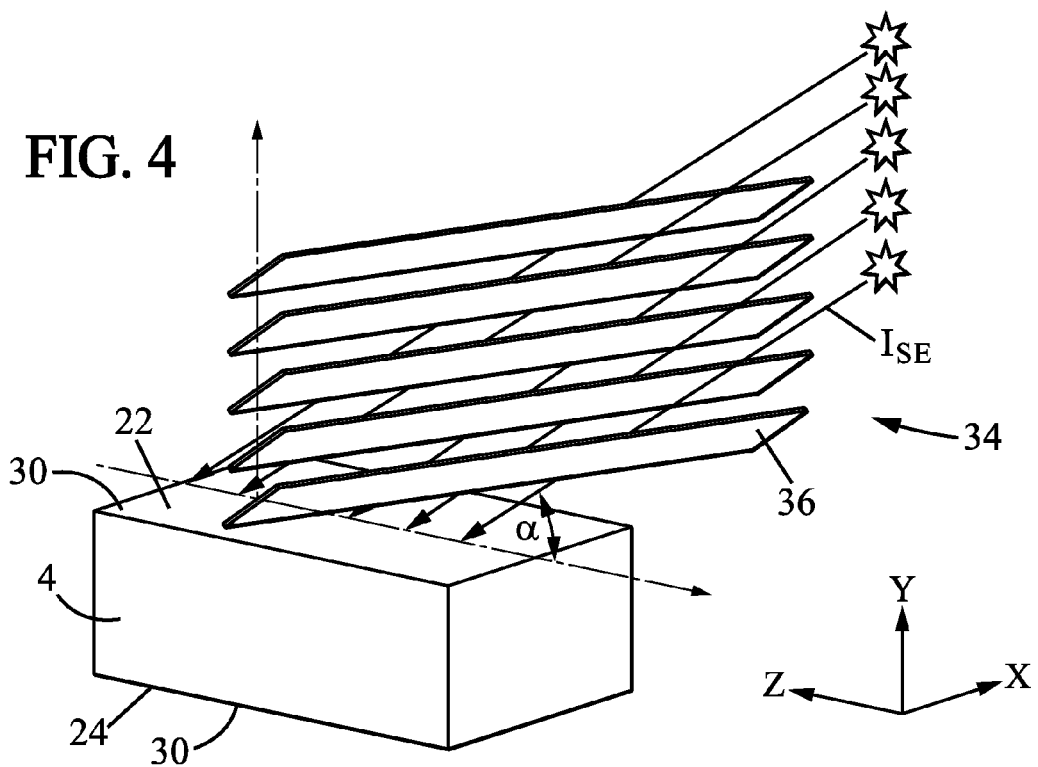
FIG. 4 is a schematic perspective view illustrating the operating mode of the first embodiment of the invention during the summer solstice.

As visible in FIGS. 4 and 6, the value of this dihedral angle α corresponds to the maximum angle formed between the outer main face 30 of the first radiator 22 and the direction of the incident solar radiation $Is_E$ during the summer solstice SE. Likewise, this value corresponds to the maximum angle formed between the outer main face 30 of the second radiator 24 and the direction of the incident solar radiation $Is_H$ during the winter solstice SH.

During operation, during the summer solstice SE, the direction of the solar radiation $I_{SE}$ is substantially parallel to the heat-transfer slats 36 of the first assembly 34, as visible in FIGS. 4 and 6. Since the heat-transfer slats have a small thickness, their presence does not lead to a loss of thermal rejection capacity for the first radiator 22. Almost all of the incident solar radiation $I_{SE}$ reaches the first radiator 22. The first supporting arm 32 pivots about its longitudinal axis (A-A) (about the Y direction) at a speed equal to the speed of revolution of the sun around the spacecraft. Thus, the direction of the solar radiation $Is_E$ is parallel to the heat-transfer slats throughout the day.

During the winter solstice SH, the direction of the solar radiation $I_{SH}$ is parallel to the heat-transfer slats of the second assembly 35 of slats attached to the second supporting arm 33 located on the side having the face +Y 18. The presence of the heat-transfer slats do not lead to heat loss for the second radiator 24.

Figure 5:
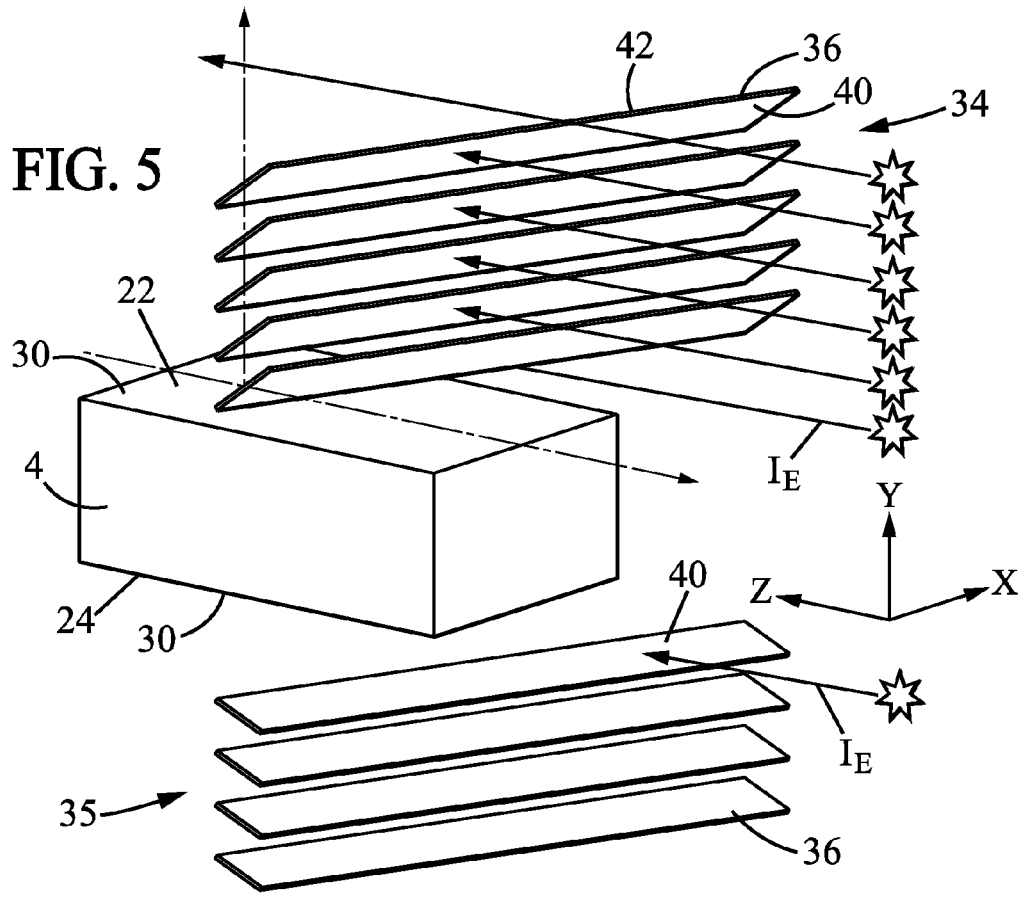
FIG. 5 is a schematic perspective view illustrating the operating mode of the first embodiment of the invention during the equinox.

In reference to FIGS. 5 and 6, during the vernal equinox EP and during the autumnal equinox EA, the direction of the incident solar radiation $I_E$ extends in the plane (X, Y). This direction $I_E$ forms an angle of approximately 23.5° with the median plane of the heat-transfer slats 36. Consequently, the absorption faces 40 of the heat-transfer slats that are facing the outer face 30 of the first radiator and the absorption faces 40 of the heat-transfer slats that are facing the outer face 30 of the second radiator absorb the UV portion of the incident solar radiation $I_E$ and are heated. The heat-transfer slats 36 can thus reach a temperature of approximately 90° C. When the heat-transfer slats 36 are hot, they radiate this heat towards the radiator located on the side having the supporting arm carrying the heat-transfer assembly. Thus, during the vernal equinox EP and during the autumnal equinox EA, the first radiator 22 and the second radiator 24 are heated and heat the faces +Y 18 and −Y 16 of the body. Just like for the summer solstice, the first supporting arm 32 and the second supporting arm 33 pivot about their longitudinal axis at a speed equal to the speed of revolution of the sun around the spacecraft in order for the incident solar radiation IE to heat the absorption faces 40 of the heat-transfer slats throughout the day.

An increase in temperature of approximately 15° C. can, for example, be achieved using an assembly of twenty-five heat-transfer slats having a size of 2,300 by 50 millimeters, two adjacent slats being spaced apart by a distance of 19.9 millimeters.

Thus, the variations in temperature between the equinoxes and the solstices are reduced.

Preferably, the absorption faces 40 of the heat-transfer slats 36 have a coating having high solar absorptivity in order to absorb as much solar radiation as possible.

They are, for example, black. A person skilled in the art in the field of thermal engineering in the space industry chooses a suitable material according to multiple criteria besides absorptivity. In general the materials and the chosen coating will have with a solar absorptivity greater than 0.6.

Preferably, the first radiator 22 and the second radiator 24 are coated with a non-specular or not very specular material in order for the radiators to not heat the heat-transfer slats 36 during the solstices by reflecting solar radiation.

Preferably, the heat-transfer slats 36 are plates having a thickness of less than one millimeter.

It should be noted that contrary to louvers, the heat-transfer slats 36 are not mobile about an axis contained in their median plane or parallel to their median plane. They are stationary with respect to the frame and the supporting arm 32 that carries them.

Alternatively, the heat-transfer slats 36 have a median plane inclined with respect to the outer main face 30 of the first and second radiators by a dihedral angle between 20° and 26°.

Each assembly 34, 35 comprises at least two heat-transfer slats 36. In each assembly, the main faces 40 of the slats are positioned parallel to each other. In each assembly 34, 35, the free space e between two adjacent superimposed heat-transfer slats is between 0.5 cm and 10 cm for slats having a width of 50 mm.

The heat-transfer slats 36 of the first assembly 34 are substantially parallel to the direction of the solar radiation $I_{SE}$ during the summer solstice SE. The heat-transfer slats (36) of the second assembly (35) are substantially parallel to the direction of the solar radiation ($I_{SH}$) during the winter solstice (SH).

The invention claimed is:

1. A spacecraft comprising:
    a body having a face +Y and a face −Y opposite the face +Y;
    a first radiator carried by at least one face out of the face +Y and the face −Y; said first radiator having an outer face;
    a first supporting arm extending substantially perpendicularly to the outer face of the first radiator, said first supporting arm having a longitudinal axis;
    a drive motor suitable for rotating the first supporting arm about said longitudinal axis of the first supporting arm, the speed of rotation of the first supporting arm being substantially equal to the speed of revolution of the sun around the spacecraft;
    a first assembly carried by the first supporting arm, said first assembly having at least one absorption face suitable for absorbing a portion of the incident solar radiation during the vernal and autumnal equinoxes, said first assembly being suitable for transmitting heat generated by said portion of the incident solar radiation absorbed to the first radiator; said absorption face being inclined with respect to the outer face of the first radiator by an angle substantially between 20° and 26°, wherein said first assembly comprises at least two slats attached one above the other and separated from each other by a free space, said at least two slats being stationary with respect to the first supporting arm.

2. The spacecraft according to claim 1, wherein said first radiator is carried by the face −Y and wherein said at least two slats of the first assembly are substantially parallel to the direction of the solar radiation during the summer solstice.

3. The spacecraft according to claim 1, further comprising:
    a second radiator carried by the other face out of the face −Y and the face +Y, said second radiator having an outer face;
    a second supporting arm extending substantially perpendicularly to the outer face of the second radiator, said second supporting arm having a longitudinal axis;
    a drive motor suitable for rotating the second supporting arm about said longitudinal axis of the second supporting arm, the speed of rotation of the second supporting arm being substantially equal to the speed of revolution of the sun around the spacecraft;
    a second assembly carried by the second supporting arm, said second assembly having at least one absorption face inclined with respect to the outer face of the second radiator by an angle substantially between 20° and 26°, and wherein said second assembly comprises a plurality of slats stationary with respect to the second supporting arm; since said slats are attached one above the other and separated from each other by a free space, and said slats of the second assembly are substantially parallel to the direction of the solar radiation during the winter solstice.

4. The spacecraft according to claim 1, further comprising at least one solar panel, and wherein at least one of said first supporting arm and said second supporting arm supports said at least one solar panel.

5. The spacecraft according to claim 1, wherein said slats comprise a polyimide film and rods suitable for rigidifying said polyimide film.

6. The spacecraft according to claim 1, wherein said absorption face has a coating having high solar absorptivity.

7. The spacecraft according to claim 1, wherein the outer face of said radiator has a non-specular coating.

8. The spacecraft according to claim 1, wherein each of said at least two slats has a thickness of less than one millimeter.

9. The spacecraft according to claim 1, wherein said at least two slats of the first assembly are parallel to each other.

10. The spacecraft according to claim 6, wherein said coating is a black coating.

* * * * *